UNITED STATES PATENT OFFICE.

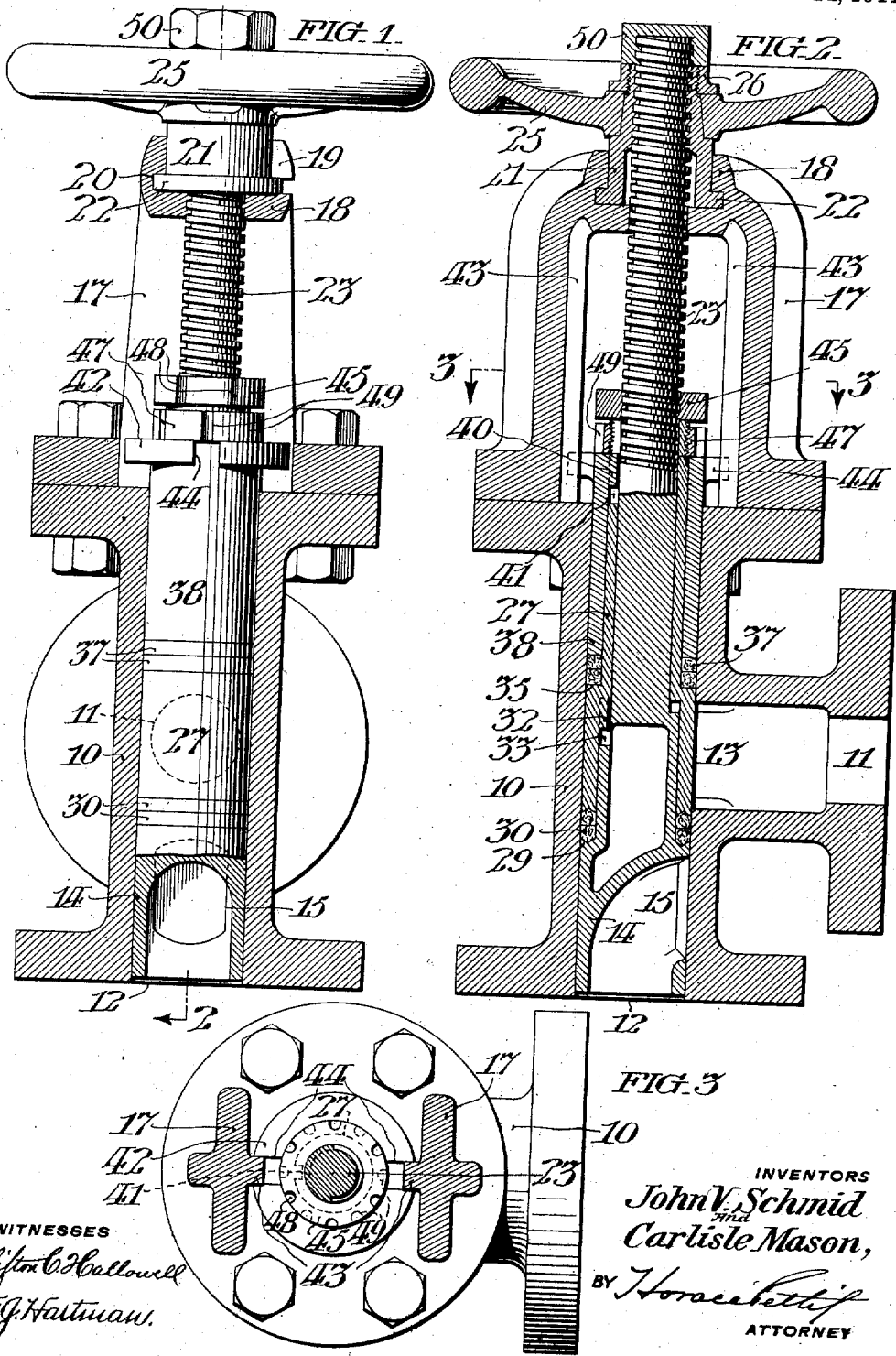

JOHN V. SCHMID, OF PHILADELPHIA, AND CARLISLE MASON, OF WYNDMOOR, PENNSYLVANIA, ASSIGNORS TO NELSON VALVE COMPANY, A CORPORATION OF PENNSYLVANIA.

VALVE.

984,243. Specification of Letters Patent. Patented Feb. 14, 1911.

Original application filed December 23, 1909, Serial No. 534,613. Divided and this application filed March 23, 1910. Serial No. 551,095.

*To all whom it may concern:*

Be it known that we, JOHN V. SCHMID, a citizen of the United States, and a resident of the city of Philadelphia, county of Philadelphia, and State of Pennsylvania, and CARLISLE MASON, a citizen of the United States, and a resident of Wyndmoor, county of Montgomery, and State of Pennsylvania, have invented certain new and useful Improvements in Valves, of which the following is a specification, reference being had to the accompanying drawings.

This invention particularly relates to blow-off valves and is a division of a co-pending application Serial No. 534,613, filed December 23, 1909. As is well known, such valves are subjected to the grinding action of the passage of hard particles, such as scale, which is contained in the sediment of the boilers, and such grinding action is exceedingly deleterious in valves which have passageways extending therethrough in any way obstructed or tortuous.

The principal objects of this invention are to provide such a valve with an unobstructed passageway leading therethrough, whereby the sediment from the boiler may be directed through said valve without subjecting it to the usual wearing action of the hard particles forming said sediment; to provide a reciprocatory piston having a port arranged to register with a port in the valve casing and carrying packing rings spaced apart and arranged to be disposed upon opposite sides of the valve port when said piston is closed, and to be shifted to one side of said port when said valve is opened; to provide means whereby the respective packing rings may be independently adjusted or compressed; and to provide means whereby the parts of the valve may be readily assembled or taken apart.

The form of this invention hereinafter described provides a valve casing having a port, a reciprocatory piston having a port registerable with the port in said casing, means arranged to reciprocate said piston and to limit its reciprocatory movement, a pair of spaced packing rings surrounding said piston and carried thereby in such relation as to be disposed above the port in said casing when said piston is in open position, and disposed upon opposite sides of said port when said piston is in closed position, the piston including an inner sleeve forming a gland for the lower packing ring and provided with a shoulder spaced from said packing, a nut engaged with the stem of said piston to adjust said sleeve with respect to said packing ring, a piston also including a gland surrounding said sleeve arranged to adjust the upper packing ring against said shoulder, a nut in threaded engagement with said sleeve arranged to adjust said gland, a frame carried by said casing and including a bearing open at one side, means rotatable in said bearing and removable laterally through said opening arranged to engage the threads of said stem to reciprocate said piston, and a flange on said piston arranged to engage suitable guides on said frame to prevent the rotation of said piston with respect to said casing.

This invention includes the various novel features of construction and arrangement hereinafter more definitely specified.

In the accompanying drawings, Figure 1 is a central, transverse, vertical, sectional view of a valve conveniently embodying this invention, showing certain of the parts in elevation for convenience of illustration; Fig. 2 is a central, vertical, longitudinal, sectional view of the valve shown in Fig. 1, taken on the line 2 in said figure; Fig. 3 is a plan sectional view of said valve, taken on the line 3—3 in Fig. 2.

In said figures, the casing 10 provides the inlet 11 and outlet 12, and has the port 13 controlled by the piston 14, comprising the piston body, having the port 15 arranged to register with the port 13 when said piston is shifted to its uppermost or open position. Said casing 10 is surmounted by the yoke frame 17, having the bearing 18, which is provided with the milled slot 19, having the groove 20, and is arranged to receive the hub 21, having the flange 22 in unitary relation therewith arranged to rotate in said groove 20. The hub 21 is arranged to engage the threaded stem 23 formed in unitary relation with the piston 14, and said hub is conveniently rotated by the hand-wheel 25, secured thereto by the nut 26, to reciprocate the piston 14 to its respectively open and closed positions with respect to the port 13.

The piston body carries the sleeve 27, which forms a gland having its edge grooved in opposition to the grooved shoulder 29 formed on the piston body for the packing 30. The sleeve 27 is provided with a lug 32, arranged to engage the recess 33 in said piston body, which permits their relative movement axially, but prevents their relative rotation. Said sleeve 27 is provided with a shoulder 35, arranged to support the packing 37 which surrounds said sleeve and which is conveniently compressed by the gland 38 surrounding the sleeve 27 and carried thereby. The gland 38 is provided with a lug 40, arranged to engage the slot 41 in the sleeve 27, and said gland is also provided with a laterally extending flange 42 having suitable opposed recesses 44, the walls of which embrace the opposed ribs or guides 43 projecting from the frame 17 and arranged to prevent relative rotation of the sleeve 27, gland 38 and the piston body with respect to the casing 10, which thereby insures the proper alinement of the ports 13 and 15. The sleeve 27 is conveniently adjusted to compress the packing 30 by the engagement of the nut 45 with the threaded stem 23 of said piston 14. The gland 38 is axially adjustable relative to the sleeve 27, to compress the packing 37 by the engagement of the nut 47, which is in threaded engagement with the upper end of said sleeve 27. Said nuts 45 and 47 are respectively provided with peripheral slots 48 and 49, and may be conveniently rotated by a suitable spanner wrench adapted to engage said slots. The piston 14 is limited in its downward movement by the nut 50 forming a cap for the end of the threaded stem 23, and is arranged to abut against the upper face of the nut 26, and said piston is limited in its movement upward, to register its port 15 with the port 13, by the engagement of the nut 45 with the lower face of the bearing 18 of the frame 17.

It is to be noted that the bearing 18 being constructed as above described permits the parts of the valve to be readily taken apart and removed; for instance, the valve wheel may be rotated until the threaded stem is disengaged from its hub 21, whereupon said hub may be slid laterally from the milled slot 19. The flange 22 engaging the groove in the bearing 18 prevents axial movement of said hub 21, whereby the rotation of said hub effects the axial movement of the piston 14.

It may be observed that the relative positions of the stem 23 and the hub 21 of the wheel 25 visibly indicate the relative positions of the port 15 in the piston 14, and the port 13 in the casing 10. Furthermore, it may be noted that by the arrangement of the packing, as above described. each of the packing rings 30 and 37 may be independently adjusted or compressed, so that when either of the packing rings tend to leak it may be compressed by its respective gland without disturbing or in any way affecting the properly sealed packing ring.

It is not desired to limit this invention to the precise details of construction and arrangement herein set forth, as it is obvious that various modifications may be made therein without departing from the essential features of the invention as defined in the appended claims.

Having thus described our invention, we claim:

1. A valve having a piston, spaced packing rings carried by said piston, and a plurality of means accessible when said piston is in operative position, arranged to be independently adjusted to compress said packing rings separately.

2. In a valve, the combination with a casing including a port, of a piston arranged to control said port, spaced packing rings carried by said piston, and a plurality of means exterior to said casing arranged to independently compress said respective packing rings.

3. A valve having a reciprocatory piston, spaced packing rings carried by said piston, and a plurality of means carried by said piston relatively adjustable and movable independently of said piston when the latter is in operative position to separately compress said packing rings.

4. A valve having a movable piston, packing rings carried by said piston, said piston comprising means to space said packing rings and arranged to compress one of said rings independently of the other packing ring, and said piston also comprising means movable with respect to said spacing means arranged to compress said other packing ring independently of the first packing ring.

5. A valve having a movable piston, packing rings carried by said piston, said piston comprising spacing means arranged to compress one of said packing rings and forming a seat for the other packing ring, and said piston also comprising means movable with respect to said spacing means arranged to compress said last named packing ring against said seat independently of the first packing ring.

6. In a valve, the combination with a casing including a port, of a piston arranged to control said port, spaced packing rings carried by said piston, said piston comprising a sleeve forming a gland arranged to compress one of said rings, and a second sleeve forming a gland arranged to compress the other of said packing rings, and means exterior to said casing arranged to independently shift said sleeves.

7. In a valve, the combination with a casing including a port, of a piston arranged to control said port, spaced packing rings carried by said piston, said piston comprising an inner sleeve arranged to compress one packing ring, and an outer sleeve surrounding said inner sleeve arranged to compress the other packing ring, means in threaded engagement with said piston arranged to shift the first mentioned sleeve to compress its packing ring, and means in threaded engagement with said inner sleeve arranged to shift said outer sleeve to compress its packing.

8. In a valve, the combination with a casing including a port, of a piston arranged to control said port, packing rings carried by said piston, said piston comprising means arranged to maintain said rings in spaced relation, and to compress one of said rings, and said piston also comprising a sleeve arranged to compress the other ring, and means arranged to shift said sleeve independently of said spacing means.

9. In a valve, the combination with a casing including a port, of a piston arranged to control said port, packing rings carried by said piston, said piston comprising spacing means forming a gland for one of said rings, and having means to prevent its rotation relative to the remaining portion of the piston, means to shift said spacing means axially to compress one packing ring, and said piston also comprising a sleeve forming a gland for the other packing ring, and means arranged to shift said sleeve independently of said spacing means to compress said first named packing ring.

10. In a valve, the combination with a casing including a port, of a piston arranged to control said port, packing rings carried by said piston and arranged to be disposed on opposite sides of said port when closed, and upon one side of said port when open, said piston comprising means arranged to maintain said rings spaced apart, and forming a gland for one of said rings, a nut in threaded engagement with said piston, arranged to shift said spacing means to compress one packing ring, and said piston also comprising a sleeve surrounding said spacing means and forming a gland for the other packing ring, and a nut in threaded engagement with said spacing means, arranged to shift said sleeve independent of said spacing means to compress said packing ring.

11. In a valve, the combination with a casing including a port, of a piston arranged to control said port and provided with a threaded stem, a frame carried by said casing and comprising a bearing having a lateral slot, a flanged hub in threaded engagement with said stem and rotatable in said bearing, and removable through said slot, and means arranged to rotate said hub to shift said piston.

12. In a valve, the combination with a casing including a port, of a piston having a body portion arranged to control said port and provided with a threaded stem, packing rings carried by said piston disposed above and below said port when said piston is in closed position, said piston comprising means arranged to maintain said rings in spaced relation and forming a gland for one of said rings, and said piston also comprising a sleeve forming a gland for the other packing ring, means arranged to shift one of said glands independently of the other, and means to shift both of said glands independently of said piston body portion, a frame carried by said casing and comprising a bearing, a removable flanged hub in threaded engagement with said stem and rotatable in said bearing, and means arranged to rotate said hub to shift said piston.

13. In a valve, the combination with a casing including a port, of a piston arranged to control said port and provided with a threaded stem, a frame carried by said casing and having guides, and a bearing open on one side, a flanged hub arranged to be engaged in said bearing by slipping it into said bearing laterally, and arranged to engage said threaded stem, whereby the rotation of said hub shifts said piston, and means on said piston arranged to engage said guide to prevent its rotation with respect to said casing.

14. In a valve, the combination with a casing including a port, of a piston arranged to control said port and provided with a threaded stem, a frame carried by said casing and including a slotted bearing, a flanged hub mounted for rotation in said bearing, and removable therefrom laterally through the slot, and in threaded engagement with said stem, a hand wheel arranged to rotate said hub, and an abutment carried by said stem arranged to engage said wheel, to limit the movement of said piston, and means carried by said piston arranged to engage said frame to prevent its rotation with respect to said casing.

In witness whereof, we have hereunto set out hands this 17th day of March, 1910.

JOHN V. SCHMID.
CARLISLE MASON.

Witnesses:
HARRY I. LANDIS,
H. C. BAYNARD.

It is hereby certified that in Letters Patent No. 984,243, granted February 14, 1911, upon the application of John V. Schmid, of Philadelphia, and Carlisle Mason, of Wyndmoor, Pennsylvania, for an improvement in "Valves," errors appear in the printed specification requiring correction as follows: Page 1, line 60, the article "a" should read *said;* and page 3, line 111, the word "out" should read *our;* and that the said Letters Patent should be read with these corrections therein that the same may conform to the record of the case in the Patent Office.

Signed and sealed this 14th day of March, A. D., 1911.

[SEAL.] E. B. MOORE,

*Commissioner of Patents.*